United States Patent [19]
Clayman

[11] 3,990,917
[45] Nov. 9, 1976

[54] RESERVE BATTERIES

[75] Inventor: William Clayman, Norwalk, Conn.

[73] Assignee: Charles S. Naiman, Brookline, Mass.

[22] Filed: Dec. 5, 1974

[21] Appl. No.: 529,729

Related U.S. Application Data

[62] Division of Ser. No. 428,340, Dec. 26, 1973, Pat. No. 3,865,631.

[52] U.S. Cl. .............................. 429/48; 429/110
[51] Int. Cl.² .......................................... H01M 4/06
[58] Field of Search ............ 136/114, 90, 112, 113, 136/120

[56] References Cited
UNITED STATES PATENTS

| | | |
|---|---|---|
| 2,948,767 | 8/1960 | Johnson et al. ..................... 136/113 |
| 3,629,092 | 12/1971 | George ........................... 136/114 X |
| 3,713,894 | 1/1973 | Weidner ............................. 136/113 |
| 3,725,133 | 4/1973 | Pollack et al. ...................... 136/114 |
| 3,865,631 | 2/1975 | Clayman ............................ 136/114 |

Primary Examiner—John H. Mack
Assistant Examiner—C. F. Lefevour
Attorney, Agent, or Firm—Wolf, Greenfield & Sacks

[57] ABSTRACT

An electrode pouch for use in a reserve battery has a flexible containment wall with first and second side wall portions defining between them a fluid impervious, electrolyte chamber. Preferably each of the side wall portions has a carrier layer of a sealable plastic material and a bonded overlying fluid barrier layer formed of a metal electrode material. The electrode pouch construction enables rapid and inexpensive manufacture at high production rates by conventional plastic film and sheet packaging equipment. The pouch is used in combination with other pouches or by itself in various battery constructions. Such batteries include means for piercing the pouch through the metal and plastic layers to release the electrolyte and activate the battery.

8 Claims, 8 Drawing Figures

RESERVE BATTERIES

This is a division of application Ser. No. 428,340, filed Dec. 26, 1973 now U.S. Pat. No. 3,865,631.

BACKGROUND OF THE INVENTION

Reserve batteries of the electrochemical type are wellknown in the art for a variety of uses where storage time before use is indefinite or extremely long. Reserve batteries have been suggested for use in applications such as batteries for fusing mines, missiles and other military explosives.

Often prior art reserve batteries have one or more disadvantages. Such disadvantages include high production costs, low volume efficiencies, erratic or relatively long activation times, irregular electrical characteristics over duration of operation, limited inactive storage life and others.

A multitude of solutions to some of the above problems have been suggested in the prior art. Yet, no single solution has been universally adopted.

SUMMARY OF THE INVENTION

It is an important object of this invention to provide an electrode pouch for use in a reserve battery which pouch enables long inactive storage times without deterioration and which can be inexpensively produced in high speed manufacture.

Still another object of this invention is to provide a reserve battery utilizing an electrode pouch, which battery has high volume efficiency and can constructed with a variety of cell members and arrangements to provide desired electrical output for a variety of uses.

According to the invention, an electrode pouch is provided for use in a reserve battery construction. The pouch is designed to hold the electrolyte and prevent fluid passage in or out of the pouch thereby prolonging the life of the electrolyte. The pouch comprises a flexible containment wall having a first and second side wall portion defining between them a liquid impervious electrolyte chamber. Each of the side wall portions are made up of a carrier layer of a sealable plastic material and a bonded overlying fluid barrier layer formed of a metal electrode material. The plastic carrier layers of each side wall are in facing relationship and are sealed at at least one border of the pouch to contain the liquid electrolyte.

In a reserve battery construction, an improved form comprises a pouch formed of a first thin layer of a metal and a second thin layer of a plastic enclosing an electrolyte with the metal being capable of acting as an electrode. Means are provided for piercing the pouch through the metal and plastic layers to release the electrolyte and activate the battery. A second electrode is positioned close to the pouch, substantially in place and a porous separator is interspaced therebetween to prevent shorting yet allow the electrolyte to activate the battery. Since the porous separator is preferably extremely thin consistent with maintaining small impedance drops, and the electrolyte is substantially in place; substantially rapid activation of the reserve battery can be carried out.

It is a feature of this invention that a plurality of cells can be formed in a reserve battery incorporating the principle of the electrode pouch. Thus, electrical power output can be predetermined as desired in multi-cell batteries constructed in accordance with this invention. Similarly, a variety of materials can be used for the electrodes and electrolytes to obtain desired electrical characteristics. An important feature of the invention resides in the use of plastic packaging techniques such as plastic film packaging techniques to form the electrode pouches rapidly and efficiently. Because the electrolyte in battery constructions of this invention, is substantially in place prior to activation, high volume efficiency and rapid actuation are possible. Since plastic and metal layers are used, fluids in liquid or vapor form do not pass through the pouch. The metal or metal salt layer used prevent gas flow into and out of the electrolyte. The plastic prevents contact between the electrolyte and electrode of the pouch, thus preventing corrosion of the electrode pouch coating. Thus contamination of the electrolyte by oxygen or other atmospheric gases does not occur. These features provide long storage life.

BRIEF DESCRIPTION OF THE DRAWINGS

The above and other objects, features and advantages of the present invention will be better understood from the following specification when read in conjunction with the accompaying drawings in which.

DESCRIPTION OF PREFERRED EMBODIMENTS

Figure 1:
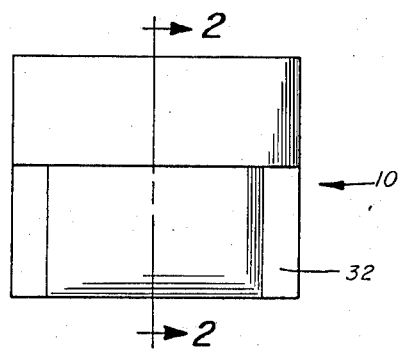
FIG. 1 is a side view of an electrode pouch constructed in accordance with this invention.
Figure 2:
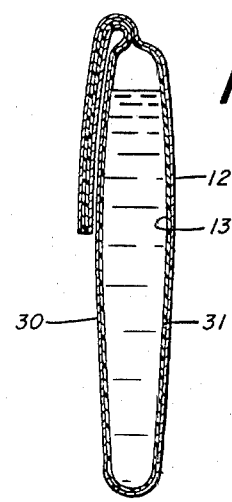
FIG. 2 is a side cross sectional view through line 2—2 thereof.
Figure 3:
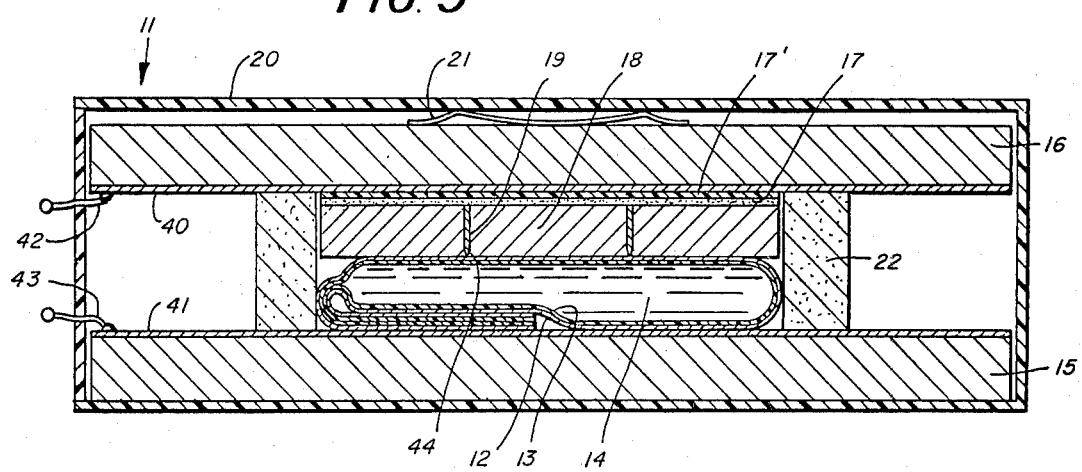
FIG. 3 is a cross sectional view through the center of a single cell reverse battery constructed in accordance with this invention.

With reference now to the drawings and more particularly FIGS. 1–3, a preferred embodiment of an electrode pouch 10 is shown incorporated in a simple one-cell reserve battery 11. The reserve battery 11 is made up of an electrode pouch 10 having a bonded or associated metal layer 12 with an inner layer of plastic 13 containing an electrolyte 14. The pouch is sandwiched between a first end plate 15 and a second end plate 16 having a layer 17 acting as a cathode with a separator assembly 18 carrying a series of piercing elements 19. The battery 11 is encased in a plastic jacket or case 20 with a resilient pressure spring 21 urging the cathode layer 17 toward the anode metallic layer 12 of the electrode pouch. A resilient encircling gasket 22 contains the separator assembly and electrode pouch between the end plates 15 and 16.

The electrode pouch 10 has a laminated film forming a side wall portion 30 and a second side wall portion 31 giving large substantially flat areas which maximize electrolyte contact and electrical output. The bonded film pouch has plural functions in that it acts to contain, protect and preserve the electrolyte as well as to form one of the electrodes of the battery. The double layered film of each side wall has an inner plastic layer which can be any sealable plastic material such as mylar, polyethylene, polypropylene, polyvinyl chloride and the like as known in the plastic film packaging art. Sealing can be conventional heat and pressure sealing, solvent sealing, hot melt adhesive sealing or the like as conventionally carried out in high speed plastic package forming equipment. The inner layer acts to carry the metallic layer for ease of handling in conventional film packaging machinery and also acts to provide a sealable means for sealing the pouch. The outer metallic layer can be any of a number of metallic materials useful as electrodes and capable of being formed in thin films preferably with pinhole-free conditons. Thus the metallic outer film prevents vapor transmission as well as passage of oxygen to the electrolyte which might tend to deteriorate it over time. The inner plastic layer prevents water or electrolyte transmission substantially keeping the electrolyte out of contact with the metallic electrode layer during storage.

The pouch is preferably closed by heat sealed seams 32 extending over three sides of the pouch. However, the flat heat sealed or solvent sealed seams 32 can extend completely around the pouch as when two distinct laminates are sealed together instead of using a single embodiment shown in FIG. 1. In this case, at least one edge of the pouch is rolled over to provide electrical contact between the outer metal layers of the pouch side walls. The shape of the pouch is preferably square although rectangular, round or other shapes can be used.

Preferably the plastic layer has a thickness in the range of from 0.0005 to 0.020 inch and the metal layer preferably has a thickness in the range of from 0.0003 to 0.010 inch so as to make for ease of over-all handling in film packaging and sealing equipment; yet, provide the liquid and gas vapor transmission properties desired along with the required amount of metal to provide desired electrical characteristics. Preferably the pouch is flexible or non-rigid. Flexibility is important to permit ease of handling in conventional packaging equipment although this characteristic plays no part in the advantages of the product once in place in a battery construction.

In a preferred embodiment of FIG. 3, the fluid tight pouch 10 is formed of a continuous polyvinyl chloride plastic film having a uniform thickness of 0.002 inch with a continuous, pinhole-free, uniform, lead over-layer film having a thickness of 0.005 inch with the pouch containing approximately 10 cc of 48% $HBF_4$ aqueous solution which acts as an electrolyte. The over-all filled pouch has a thickness from side to side of approximately 0.025 inch with length and width of 1¾ inches each. Approximately two-thirds of the pouch electrolyte pocket is filled with the electrolyte with the remainder bent over at the top as shown in FIG. 2. Partial filling of the pouch is preferably used to permit rapid manufacture on conventional machines.

The pouch is positioned between end rigid plates 15 and 16 which in the preferred embodiment are formed of epoxy resins having a thickness of approximately ¼ inch and forming square plates with height and width dimensions of 2½ inches each. The function of the end plates is to provide rigid backers and they can be conductive or non-conductive. When conductive, they act as current collectors or terminals. For example in the specific embodiment of FIG. 3, the epoxy end plates 15 and 16 have inner surface coatings of copper 40 and 41 attached to leads 42 and 43 passing out of the housing to enable takeoff of electrical energy. The copper coating 41 contacts the metallic outer layer of the electrode pouch and acts as a current collector. Alternatively, the leads 42 and 43 can be attached directly to the electrodes of the cell although better mechanical protection is provided by the use of rigid collectors. In still another alternate construction, the end plate 16 can itself be the second electrode instead of just a current collector for the cathode 17 as in the embodiment of FIG. 3.

A second electrode of the battery 11 is formed at 17 in preferably a flat sheet abutting the end plate 16. In some cases this electrode can itself act as the rigid end plate. The electrode 17 in the preferred embodiment is a cathode. However, various electrode materials can be used depending upon the particular electrolyte and electrode material of the electrode pouch as known in the art. Thus the pouch electrode in some cases may be the anode or may be the cathode as is the case with electrode 17. In the preferred embodiment, the electrode 17 is a 0.005 inch coating of lead dioxide ($PbO_2$) on a carrier sheet 17' forming the cathode of the lead, lead oxide, $HBF_4$ battery. Such lead dioxide electrode constructions for use in batteries are known in the art and are described for example in the Journal of the Electro-Chemical Society, Electrochemical Science and Technology, 1972 page 660 article entitled lead-Fluoroboric Acid battery by G. D. McDonald, E. Y. Weissman and T. Roemer.

The separator assembly 18 is shown in an enlarged oversize height form out of proportion to its actual size in order to facilitate understanding of the invention. The separator can be any conventional battery separator material such as papers, woven and non-woven plastic, asbestos, and the like which provide spacing between the electrodes. Preferably it is kept as thin as possible consistent with prevention of anode to cathode shorting yet aiding in volume and electrical efficiency of the cell. Separator thickness of from 0.001 to 0.05 inch is preferred. In the preferred embodiment, the separator is formed of a paper sheet in a form to match the dimensions of the pouch, that is, length and width of 1¾ inches each with a thickness of 0.025 inch. Embedded within the separator are piercing elements 19 which can comprise plastic piercing strips having pointed ends 44 adapted to pierce the metal and plastic layers of the pouch when pressure is applied. This enables the electrolyte to flow into the separator activating the battery. The piercing elements can be metal or plastic although when metal is used, care must be taken not to short the electrodes and the metal must be positioned out of contact with the electrode 17.

Preferably a resilient gasket 22 surrounds the pouch and separator and acts to seal fluids between the electrodes when the pouch is pierced. The gasket 22 is preferably formed of a material such as silicone rubber which is resilient to enable movement toward each other of the end plates while maintaining the seal. Sponge rubber, plastics and the like nonreactive to the electrode and electrolyte materials in use can be used. In some cases the gasket can be eliminated as where the case 20 is dimensioned to snugly receive and surround the pouch and separator.

The cuter casing 20 preferably encloses the cell and has an S-shaped spring spring steel leaf 21 positioned between it and the end plate 16. The spring 21 acts to provide resilient pressure urging the two electrodes toward each other. However, the spring pressure is not great enough to penetrate the electrode pouch. Activation is accomplished by manually squeezing the thin casing to cause piercing of the electrode pouch whereupon the spring pressure urges the electrodes toward each other maintaining a constant but small urging force throughout the life of the cell. Actuation by explosive squibs, or other manual, remote or automatic means for applying piercing pressure can be used. The urging function of the spring provides smoother electrical characteristics over the duration of operation as where the over-all chemical reaction in the cell generates a not decrease in volume. Thus, if the volume of the electrolyte decreases with the extent of discharge, then because of the positive pressure being continuously exerted, the anode and cathode will be closer together as discharge proceeds. This lowers the IR drop resulting in an increase in efficiency which offsets and compensates for the lower efficiency associated with the extent of discharge. The net result is a smoother electrical output of the cell over the duration of operation.

Because the electrolyte is substantially in place prior to piercing of the pouch, that is, it is between the electrodes, high volume efficiency can be obtained. In some prior art cells, the electrolyte must be positioned from a reserve supply to a position between electrodes causing a loss of volume efficiency.

In the preferred embodiment, using the lead fluoroboric acid materials as described above, the battery 11 has an electrical output of over 1 volt at approximately 1 amp for greater than 10 minutes with a theoretical inactive shelf life of at least 10 years and an activation time of less than ½ second.

Of course electrical characteristics sizes and dimensions can vary greatly. The electrochemical combinations suitable for use in connection with the electrode pouch include the following:

| Anode | Electrolyte | Cathode |
|---|---|---|
| Zn | KOH | HgO |
| Zn | KOH (ZnO) | C/MnO$_2$ |
| Mg | MgBr | C/MnO$_2$ |
| Zn | MgOH(CuO) | CuO |
| Zn | NaOH | CuO |
| Mg | H$_2$O(CuCl) | CuCl |
| Mg | H$_2$O(AgCl) | AgCl |
| Zn | KOH | AgO |
| Zn | KOH | C/O$_2$, Pt/O$_2$ |
| Pb | H$_2$SO$_4$ | PbO$_2$ |
| Pb | HBF$_4$ | PbO$_2$ |
| Pb | HClO$_4$ | PbO$_2$ |
| Fe | KOH | NiO$_2$ |
| Cd | KOH | NiO$_2$ |
| Zn | NH$_4$Cl, ZnCl$_2$ | C/MnO$_2$ |
| Cd | KOH | AgO |
| Zn | KOH | NiO$_2$ |

In some cases, the electrolyte can be in a gel form as known in the art as by adding a thickener. For example, hydroxy ethyl cellulose can be used as a thickener for potassium hydroxide, ammonium chloride and zinc chloride when they are used as electrolytes.

While the material of the electrode pouch serves preferably as the anode it can also be the cathode. In some cases the metal of the electrode pouch acts as a carrier for the electrode material for example the metal layer can be silver with a silver chloride coating which acts as an electrode. The term "metal" as used herein for the layers of the pouch is meant to include metal layers having a metal salt coating such as silver with a silver chloride coating, copper layers with copper oxide coating, and the like.

Figure 4:
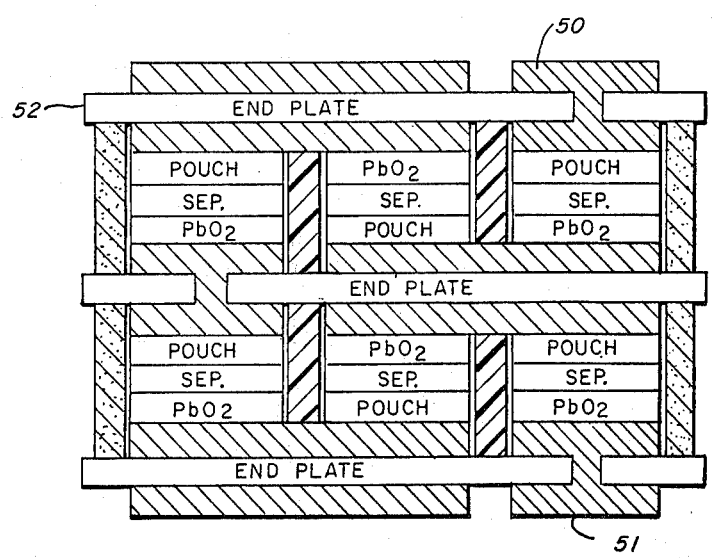
FIG. 4 is a semidiagrammatic showing of an alternate embodiment of this invention.

Many alternate embodiments of the present invention can be made utilizing plural cell batteries as for example shown in FIG. 4. In this embodiment, six cells of the general type illustrated in FIG. 3 are packaged together as shown in the diagrammatic drawing. Thus, if each cell produces 1 volt, the series arrangement would provide for a 6 volt output. The casing and spring arrangement previously described along with the piercing elements previously described are again used. A multicell arrangement of the type shown in FIG. 4 could be incorporated directly in a printed circuit board with the output conductors which may be rivets 50 and 51 attached directly to components of the printed circuit board with the top end plate 52 being the mounting board of the printed circuit board.

Figure 5:
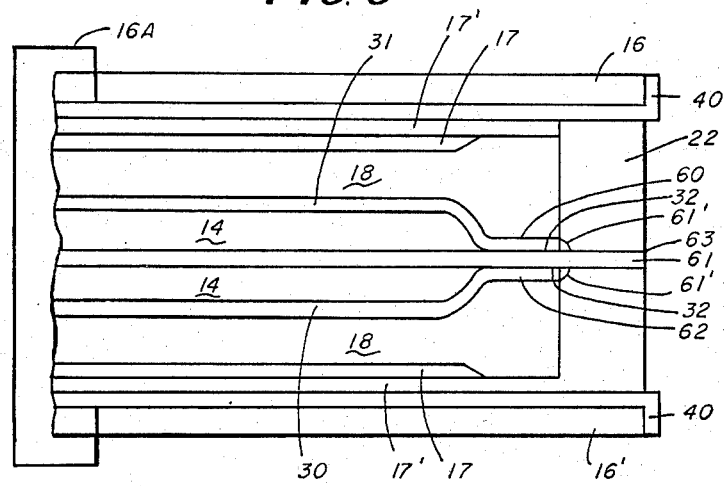
FIG. 5 is a semidiagrammatic showing of still another embodiment of the invention.

In still another alternate embodiment of this invention as illustrated diagrammatically in FIG. 5, where parts identical to the embodiment of FIG. 3 have identical numbers, the electrode pouch is slightly modified and a double cathode arrangement is used on either side of the pouch. The pouch 60 is formed of a lead polyvinyl chloride laminate film as previously described but with the heat sealed seam 32 extending completely therearound. A plastic coated lead sheet 61 having a thickness of 0.005 inch with continuous heat sealable plastic layers (not shown) on both sides thereof is heat sealed in the sandwich seam 62 and extends out of the assembly at 63. The outer metal layer of the pouch is connected to the lead layer of sheet 61 at soldered electrically conductive joints 61' after first removing the plastic underlying the joints. With this format, the lead sheet 61 provides the anode contact so that when the separator assemblies with their piercing elements pierce the pouch 60, current flow utilizes the conductive coating top end plate 16 and the conductive coating of bottom end plate 16' which are connected by wire 16A. This format provides double the electrochemically active surface area for a given geometrical area. This provides an improved arrangement of achieving in effect two cells in parallel in a given area.

While specific embodiments of the present invention have been shown and described, many variations are possible. In all cases, the use of the plastic metal laminate pouch side wall construction enables rapid and inexpensive handling and formation of pouches for use in this invention along with good sealing and fluid impermeability properties. Film packaging machinery conventional to the high speed plastic pouch packaging art such as a Bartel IM Flexible Pouch Package Machine manufactured by Riegel Packaging Machine of 1665 Elmwood Road, Rockford, Illinois 61101 or a Model 600-A machine manufactured by Production Packaging Machinery Co. of Passaic, New Jersey 07055 can be used to form and seal the packages of this invention. However, other plastic film techniques can be used. The laminate film of the side wall can be formed by conventional calender coatings, spray coatings and the like over a metal layer. In the preferred embodiment, it is preferred to form a thin plastic layer or sheet and thin metal layer or sheet which are then laminated together.

Preferably the seals formed between the side walls are hermetic seals made by heat sealing techniques known in the plastic film packaging art. However, folded over crimped seals, solvent seals and the like as known in the sealing art can be used.

The advantages of this invention are best obtained by having non-self-supporting side walls in the electrode pouches. Thus it is preferred to use highly maleable metal layers for the electrode material with lead being eminently suitable.

Figure 6:
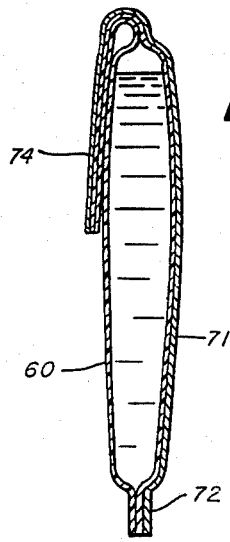
FIG. 6 is a side cross sectional view through the center of an alternate embodiment of a pouch of this invention.

While the pouch 10 has two identical side wall portions as shown in FIGS. 1 and 2, in some cases the pouch can be formed of a side wall metal-plastic laminate as the side wall 30 of FIG. 1 with a plastic sheet forming the second side wall. For example, as shown in FIG. 6, a polyvinyl chloride rectangular film sheet 60 is heat sealed at its borders 72 to a polyvinyl chloride lead laminate film sheet 71 to form a pouch. In this case the lead side is positioned adjacent the separator as in the battery of FIG. 3 and the overturned portion 74 of the pouch contacts copper layer 41. This expedient is used to reduce the amount of electrode material in the pouch. However, it does not provide outstanding vapor transmission barrier properties and is not preferred where long storage life is required.

Figure 7:
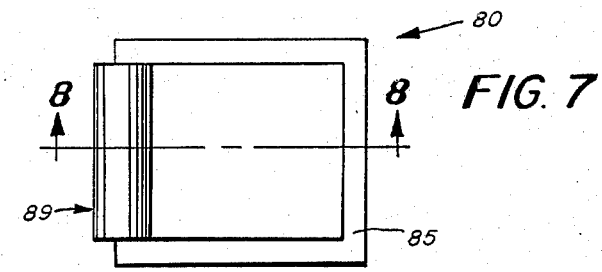
FIG. 7 is a top view of another alternate embodiment of a pouch of this invention.
Figure 8:
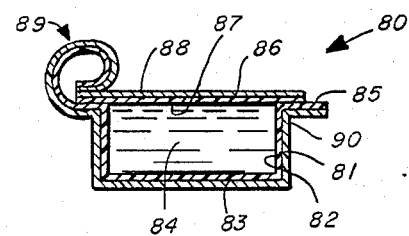
FIG. 8 is a side cross sectional view through the embodiment of FIG. 7.

In still another embodiment of this invention the electrode pouch is in the form of a cup as shown in FIGS. 7 and 8. In this embodiment the pouch or cup is designed to have the advantages of the embodiment of FIG. 1. Thus the construction can be manufactured economically at high speed on conventional plastic packaging machinery and provides a fluid barrier and electrode forming metal layer with a plastic carrier and sealable layer.

The pouch in cup form is illustrated generally at 80 in FIGS. 7 and 8 and has a bonded sheet 81 formed of an inner layer 82 of plastic and outer layer 83 of metal capable of acting as an electrode and fluid barrier. The metal and plastic layer 82 and 83 are formed of materials as previously described with respect to corresponding layers 13 and 12. Layers 82 and 83 in laminated form are preferably shaped as by vacuum or pressure molding into the cup configuration. The cup can be square, rectangular or irregular shaped as desired for any particular application. The cup provides an electrolyte carrying chamber 84 which is filled with an electrolyte as previously described. An outwardly extending peripheral lip 85 provides a plastic sealable layer to which a lid 86 is sealed in an encircling peripheral seal as at 90. The lid 86 has an inner layer of plastic 87 and an outer layer of metal 88 as previously described with respect to side wall 30 so that it forms a side wall of the electrode pouch in the cup form 80. In some cases the lid can be a single sheet of plastic, however, this is not preferred for the reasons given in connection with the discussion of the embodiment of FIG. 6.

In the embodiment of FIGS. 7 and 8 the plastic layers preferably have a uniform thickness of from 0.0005 to 0.050 inch and the metal layers preferably have a uniform thickness of from 0.003 to 0.010 inch. The plastic layers can be thicker in this embodiment and the degree of flexibility and the non-self-supporting feature is not required since conventional high speed plastic forming and packaging equipment available for such packages do not require these limitations. Thicker metal coatings can be used for layer 88 if desired to increase the electrode material available in battery constructions. Since the lid 86 is not vacuum or pressure formed as in the cup bottom, increased metal thickness is not an important consideration in manufacturing.

Preferably at least one edge of the cup rim is rolled over as at 89 to enable electrical contact between the outer metal layers of the lid and cup bottom. This same rolled over construction can be used in the embodiment of FIG. 1 where the side walls 30 and 31 are formed of separate sheets sealed about all four sides.

The electrode pouch in cup form 80 is used in battery constructions as previously described. For example cup 80 can replace pouch 10 in the construction of FIG. 3.

What is claimed is:

1. A liquid electrolyte containing electrode pouch for use in a reserve battery,
   said pouch comprising a containment wall having a first and second side wall portion defining between them a fluid impervious electrolyte chamber,
   said first side wall portion have an inner carrier layer of a sealable plastic material and an overlying outer fluid barrier layer formed of a metal electrode material,
   said second side wall portion comprising a sealable plastic layer,
   said plastic layers of each side wall portion being in facing relationship and sealed at a border of said pouch with said liquid electrolyte contained therein with said metal being compatible with said electrolyte to form an electrode of a battery in the presence of a second compatible electrode.

2. An electrode pouch in accordance with claim 1 and further comprising said second wall portion having said plastic layer as an inner carrier layer and an overlying outer fluid barrier layer formed of a metal electrode material.

3. An electrode pouch in accordance with claim 1 wherein said first side wall forms a portion of a cup shaped component of said pouch.

4. An electrolyte pouch in accordance with claim 2 and further comprising said carrier layers having a thickness in the range of from 0.0005 to 0.020 inch and said barrier layers each having a thickness of from 0.0003 to 0.010 inch and said containment wall is non-self-supporting.

5. An electrolyte pouch in accordance with claim 2 and further comprising said carrier layers having a thickness in the range of from 0.0005 to 0.050 inch and said barrier layers each having a thickness of from 0.0003 to 0.010 inch.

6. An electrode pouch in accordance with claim 4 and further comprising, a thin layer dividing said electrolyte chamber into two chamber portions with said thin layer extending between and sealed between said plastic carrier layers at said border.

7. An electrode pouch in accordance with claim 4 wherein said metal is lead.

8. An electrode pouch in accordance with claim 6 wherein said thin layer is formed of a metallic electrode material.

* * * * *